(12) United States Patent
Dold et al.

(10) Patent No.: US 10,520,310 B2
(45) Date of Patent: Dec. 31, 2019

(54) SURFACE SURVEYING DEVICE FOR DETERMINING 3D COORDINATES OF A SURFACE

(71) Applicant: LEICA GEOSYSTEMS AG, Heerbrugg (CH)

(72) Inventors: Jürgen Dold, Sempach (CH); Thomas Harring, Baar (CH); Burkhard Böckem, Rieden AG (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 181 days.

(21) Appl. No.: 15/342,108

(22) Filed: Nov. 2, 2016

(65) Prior Publication Data

US 2017/0122736 A1 May 4, 2017

(30) Foreign Application Priority Data

Nov. 3, 2015 (EP) ..................................... 15192815

(51) Int. Cl.
*H04N 5/232* (2006.01)
*G01C 15/00* (2006.01)
*H04N 5/225* (2006.01)

(52) U.S. Cl.
CPC ......... *G01C 15/006* (2013.01); *H04N 5/2257* (2013.01)

(58) Field of Classification Search
CPC .... G01C 15/006; B64C 39/024; B64C 39/022
USPC ........................................................ 348/135
See application file for complete search history.

(56) References Cited

U.S. PATENT DOCUMENTS

| 8,422,035 B2 | 4/2013 | Hinderling et al. |
| 9,056,676 B1 * | 6/2015 | Wang .................... B64F 1/00 |
| 9,285,477 B1 * | 3/2016 | Smith .................... G01S 17/89 |
| 9,938,001 B1 * | 4/2018 | Parent .................. B64C 39/024 |

(Continued)

FOREIGN PATENT DOCUMENTS

| CN | 103426282 A | 12/2013 |
| CN | 103492967 A | 1/2014 |

(Continued)

OTHER PUBLICATIONS

European Search Report dated Apr. 14, 2016 as received in Application No. 15192815.7.

*Primary Examiner* — Jeffery A Williams
(74) *Attorney, Agent, or Firm* — Maschoff Brennan (57) ABSTRACT

Some embodiments include a surface surveying device, in particular profiler or 3D scanner, for determining a multiplicity of 3D coordinates of measurement points on a surface, comprising a scanning unit and means for determining a position and orientation of the scanning unit, a carrier for carrying the scanning unit and at least part of the means for determining a position and orientation, and a control and evaluation unit with a surface surveying functionality. The carrier is embodied as an unmanned aerial vehicle which is capable of hovering and comprises a lead, the latter being connected at one end thereof to the aerial vehicle and able to be held at the other end by a user, wherein the lead is provided for guiding the aerial vehicle in the air by the user and the position of the aerial vehicle in the air is predetermined by the effective length of the lead.

17 Claims, 4 Drawing Sheets

(56) References Cited

U.S. PATENT DOCUMENTS

| | | | |
|---|---|---|---|
| 2002/0030142 A1* | 3/2002 | James | B64C 29/0025 244/194 |
| 2004/0167682 A1 | 8/2004 | Beck et al. | |
| 2010/0121601 A1* | 5/2010 | Eckert | F41G 7/007 702/104 |
| 2012/0303179 A1 | 11/2012 | Schempf | |
| 2013/0233964 A1* | 9/2013 | Woodworth | B64C 37/02 244/2 |
| 2013/0317667 A1* | 11/2013 | Kruglick | B64C 39/024 701/2 |
| 2014/0032021 A1 | 6/2014 | Metzler et al. | |
| 2014/0247439 A1 | 9/2014 | Neier et al. | |
| 2014/0267627 A1 | 9/2014 | Freeman et al. | |
| 2014/0332688 A1* | 11/2014 | Cothuru | G01M 11/005 250/353 |
| 2015/0022640 A1* | 1/2015 | Metzler | H04N 13/211 348/46 |
| 2015/0212391 A1 | 7/2015 | Waibel et al. | |
| 2015/0268666 A1 | 9/2015 | Wang et al. | |
| 2016/0047675 A1* | 2/2016 | Tanenhaus | G01C 25/005 702/104 |
| 2016/0101856 A1* | 4/2016 | Kohstall | G05D 1/101 244/17.13 |
| 2016/0349746 A1* | 12/2016 | Grau | G05D 1/0094 |
| 2018/0196419 A1* | 7/2018 | Wang | G05D 1/08 |

FOREIGN PATENT DOCUMENTS

| | | |
|---|---|---|
| CN | 103983255 A | 8/2014 |
| CN | 104769496 A | 7/2015 |
| EP | 2 811 318 A1 | 12/2014 |
| WO | 97/40342 A2 | 10/1997 |
| WO | 2007/141795 A1 | 12/2007 |
| WO | 2009/053085 A1 | 4/2009 |
| WO | 2015/169338 A1 | 11/2015 |

* cited by examiner

SURFACE SURVEYING DEVICE FOR DETERMINING 3D COORDINATES OF A SURFACE

FIELD OF THE INVENTION

Some embodiments of the invention relates to a surveying device comprising a scanning unit for determining a multiplicity of 3D coordinates of measurement points of a surface, a method for determining 3D coordinates and an unmanned aerial vehicle which is capable of hovering for use as a carrier of a scanning unit.

BACKGROUND

Surveying devices for registering topographies of an object to be surveyed, e.g. a building or terrain, for example for surveying, testing or documentation, are known e.g. as scanners or profilers. By way of example, PCT/EP2008/009010 describes an apparatus which is able to quickly and dynamically measure distances using a moving measurement beam. Applications are simple rotational scanners or profilers aligned to the perpendicular. A surveying device for three-dimensional surveying of an object in each case registers the spatial position of a surface point of the object, i.e. the 3D coordinates thereof, by virtue of emitted laser radiation being diffusely reflected by the object surface and the distance to the targeted surface point being measured on the basis of diffusely reflected laser radiation. To this end, the surveying device has a scanning unit with a laser beam source, a deflection apparatus for swiveling the laser radiation, registering means for registering the diffusely reflected laser radiation and a detector or rangefinder. This distance measurement is linked to angle or directional information of the laser emission such that the spatial position of the registered point can be determined from these items of distance and angle information and the surface of the object can be surveyed continuously. Such surface surveying devices according to the prior art allow a user to register large surfaces and objects with relatively little time outlay—depending on a desired point-to-point resolution—completely and, optionally, with additional object information, wherein target points may be recorded at a very high rate, e.g. of several hundred thousand points per second. Hence, the distances to a multiplicity of points are able to be registered within a short period of time in a manner dependent on the respective scanning angle. A 3D point cloud is generable by such a surveying of a multiplicity of points, the 3D point cloud representing the three-dimensional nature of the object surface by means of a set of points with defined point positions in a common coordinate system. The point-to-point resolution of the registered object points and the resultant point cloud is set by the speed with which the laser beam is swiveled over the surface and by the scanning rate. By way of example, the resolution is 1.0 mm on a 100 m measurement path in the case of laser scanners.

By way of example, WO 97/40342 describes a method which records a topography by surveying devices set up in a stationary manner. For these devices, a fixed setup point is selected, which serves as a basis for a scanning process effected by motors such that the recording or scanning location (as position of the scanning unit relative to the scanned object) therefore remains unchanged during the scanning. The three-dimensional spatial information of the respective surface point is derivable by way of the distance to the measured point, the angle position at the time of the measurement and the known location of the apparatus. Here, the scanner or profiler systems, in particular the rangefinders thereof, are specifically designed for the object of registering topography and scan a surface by moving the scanning unit or by changing the beam path along one axis (profiler) or two axes (scanner).

Other methods employ mobile surface surveying devices, which scan a surface to be registered by a movement of the device, or assist or complement the scanning. PCT/EP2014/059138 discloses a mobile profiler which has a scanning unit on a surveying rod (plumb rod), which is able to be carried or displaced by a user, as a carrier. The scanning unit has a laser, with the produced laser beam being rotatable about an axis such that a laser plane is spanned, the line of intersection of which with the surface to be surveyed yields the measurement profile of a multiplicity of measurement points. Furthermore, a GNSS receiver is attached to the surveying rod for the purposes of determining the position of the surveying device. Moreover, the surveying device has a camera module, which is likewise carried by the surveying rod and optionally has an inertial measurement unit (IMU). With the aid of these means, position and orientation of the surveying rod are determined and the position and orientation of e.g. the scanning unit are determined by the fixed relative position of the units in relation to one another. Hence, it is possible to generate a point cloud, which represents the surface of the object to be surveyed, by scanning with the laser beam, taking account of the relative position or movement of the surveying device or scanning unit in relation to the surface. An advantage of a mobile or portable surface surveying device is that it is easy to change the recording location and hence it is possible to survey very extended or elongate surfaces, for example. A disadvantage of the device disclosed in PCT/EP2014/059138 is that carrying such a device is cumbersome for the user and the plumb rod is unwieldy; this holds true all the more, the longer the surveying rod is. At the same time, it would be desirable for some surveying problems, e.g. the generation of 3D coordinates of a high object such as a multistory building or an object situated far above the ground, if the scanning unit were to be positionable as high as possible or far above the ground.

SUMMARY

Some embodiments of the present invention provide an improved surface surveying device, preferably of a 3D scanner or profiler.

Some embodiments of the present invention lie in the provision of a mobile surface surveying device, preferably of a 3D scanner or profiler, which has improved handling by a user.

Some embodiments of the present invention lie in the provision of a mobile surface surveying device, preferably of a 3D scanner or profiler, with improved positionability.

The subject matter of the invention is a surface surveying device, preferably embodied as a 3D scanner or profiler, for determining a multiplicity of 3D coordinates of measurement points of a surface. Optionally, the surface surveying device is embodied for generating a 3D point cloud, representing the surface, on the basis of the 3D coordinates. The surface surveying device has a scanning unit for optically scanning the surface. The scanning unit has a transmission unit for emitting optical, coherent and collimated measurement radiation, preferably laser radiation, a deflection apparatus for scanning guidance of the measurement radiation over the surface in at least one deflection direction, means for registering the relative deflection direction in each case, and a detector for detecting the measurement radiation reflected by a respective measurement point. Here, the relative deflection direction is understood to mean the deflection direction in which the measurement radiation is emitted in each case by the guidance of the deflection apparatus, relative to the scanning unit or to a reference direction, e.g. a zero direction, which relates to the surface surveying device. Furthermore, the surface surveying device has means for determining a position and orientation of the scanning unit, and a control and evaluation unit with a surface surveying functionality for controlling the scanning unit and for determining the 3D coordinates of the measurement points on the basis of the respective deflection direction and a distance value derived by means of detected measurement radiation. Here, the distance is a spacing between the surface surveying device or the scanning unit and the surface or, more precisely, the respective measurement point on the surface. Moreover, the surface surveying device has a carrier for carrying the scanning unit and at least part of the means for determining a position and orientation.

According to the invention, the carrier is embodied as an unmanned aerial vehicle which is capable of hovering and comprises a lead, the latter being connected at one end thereof to the aerial vehicle and being able to be held at the other end by a user. The lead is provided for guiding the aerial vehicle in the air by the user and the position of the aerial vehicle in the air is predetermined by the effective length of the lead, said length, preferably, being changeable by the user. Preferably, the alignment of the aerial vehicle is also predetermined by means of the lead. Here, the effective length of the lead should be understood to mean the length which the lead assumes between the aerial vehicle and the user holding point thereof. The complete length of the lead may correspond thereto, but it is greater in the case of a changeable effective length such that, for example, some of the lead may be rolled up by the user in order to reduce the effective length. By way of example, the length of the lead is approximately one meter to a few meters, especially for surveying devices which are provided for indoors, and up to several ten meters for measurements outside, where line lengths of up to approximately 80 m-100 m are also conceivable.

Thus, according to the invention, part of the surface surveying device is carried by an aerial vehicle which is capable of hovering, especially the scanning unit, such that the scanning unit is positionable in the air, with the position of the aerial vehicle, and hence of the scanning unit, including the height thereof above the ground or over the location of the user, being predetermined by the user by way of the lead. Moreover, the aerial vehicle is guidable by the user by means of the lead such that the scanning unit can be brought to a desired location in the air, through the air in a mobile manner by the user, for example by virtue of the user running to the ground projection of the desired location or the vicinity thereof and holding or pulling the lead. The lead therefore serves as primary or preferential element with which the user controls the aerial vehicle, at least in respect of translation. This advantageously renders locations reachable, and hence renders surfaces measurable, by the scanning unit, in an improved manner or at all, which are not reachable, or only badly reachable, using surface surveying devices from the prior art, which are e.g. securely stationed on the ground or which are carried by a surveying rod. By way of example, this allows detailed structures, which are not situated near the ground, as can often be found in the case of historic structures or buildings, to be measured in 3D. Moreover, the present invention offers advantages in respect of the surface measurement of high or sprawling objects, such as churches, castles, monuments, industrial buildings (refineries or plant floors), heavy machinery, aircraft or ships, both inside and outdoors.

According to the invention, the lead is moreover electrically conductive. In some embodiments, it serves, in this case, as a power cable for supplying parts of the surface surveying device situated in the air with energy, especially the aerial vehicle (particularly if the latter is motor-driven), and/or the scanning unit. Alternatively, or additionally, the electrical conductivity of the guide lead is used for control and/or data signal transmission such that the lead serves as data or signal cable from and/or to the parts of the surface surveying device situated in the air. By way of example, this allows electrical control signals to be transferable from the user to the aerial vehicle and/or the scanning unit in a mechanical manner by means of the lead in addition to the above-described primary control or guidance, and/or data, especially measurement data such as the registered deflection direction or distance values or the 3D coordinates, are transferred from the scanning unit to a user unit.

Here, the user unit is part of the surveying device and e.g. embodied as a portable field controller, which is preferably connected to the lead which serves as a cable or which, alternatively, communicates wirelessly with other units of the surveying device. Alternatively, this is an external user unit such as a smartphone or tablet. Here, the surface surveying device, preferably the lead, optionally has an interface (wired such as e.g. a USB or wireless such as e.g. Bluetooth) for connecting the external user unit.

Since the carrier facilitates six degrees of freedom for the scanning location or the position and orientation of the scanning unit, the means for determining a position and orientation are embodied in a manner appropriate for the derivation or establishment of the six degrees of freedom of the carrier or the scanning unit. In this case, it is optional, preferably in embodiments embodied as a profiler, for the means for determining the position and orientation to be embodied for active determination of the position and orientation, preferably in a continuous manner, for the purposes of obtaining position and orientation values as storable data such that these are available permanently and, in particular, after completion of the measurement and translational and/or rotational accelerations or changes in position and/or orientation of the scanning unit (or of the measurement object) are measured and the measured accelerations are taken into account when determining the 3D coordinates of the object or of the surface. Alternatively, or additionally, the means are embodied for continuous passive determination of the position and orientation for the purposes of stabilizing the flight of the aerial vehicle. In the case of passive determination, the position and orientation values can therefore be treated like volatile, non-permanent data, which are used instantaneously for optimizing the flight behavior of the aerial vehicle and which may be discarded thereafter.

Optionally, the means for determining the position and orientation have, on the carrier side, sensors for continuously measuring an acceleration and/or rate of rotation and/or magnetic alignment. By way of example, the means have a 3-axis acceleration sensor, a 3-axis gyroscope, inclination sensors or an inertial measurement unit (IMU). Furthermore, within the scope of this option, the means have at least one camera for continuously recording an image of an image series within the scope of a camera-based independent localization and/or receivers for continuously receiving position reference signals, in particular GNSS signals and/or pseudolite signals. Moreover, the control and evaluation unit is embodied for carrying out an algorithm, preferably a state estimation algorithm, specifically on the basis of a Kalman filter, for continuously calculating the position and orientation on the basis both of the continuously established data from the sensors (i.e., for example, the measured acceleration values thereof) and from those of the camera and/or signal receivers, the calculation preferably being carried out in real time.

In embodiments in accordance with the option described above, comprising a camera for the camera-based independent localization, the algorithm—for the execution of which the control and evaluation unit is embodied—is embodied to determine position and orientation of images in the image series on the basis of resection with the aid of surface points which are registered in at least two images of the image series. Here, the algorithm preferably has structure-from-motion (SfM) or SLAM algorithms, or such routines are part of the algorithm. Optionally, the surface points are selected for resection by means of feature-extraction algorithms and/or tracking algorithms.

In some embodiments, the aerial vehicle is passive, i.e. without drive or control means. Here, the aerial vehicle is preferably embodied as a balloon, which, for example, is filled with helium. The advantage of such embodiments predominantly lies in a simple design and the low energy consumption, and hence in low production, operation and servicing costs.

By contrast, in preferred embodiments the aerial vehicle has at least one drive means (motor or rotor) and/or control means, e.g. a rudder or rotor, for actively adapting the position and/or alignment predetermined by the effective length of the lead. Preferably, such an active aerial vehicle is embodied as an aerostat or dirigible, i.e. as aerial vehicle in which the uplift is at least partly obtained by a gas filling, or as a multicopter, i.e. an aerial vehicle, in which the uplift is generated by rotors. With an active aerial vehicle as a carrier, the present invention offers further advantages. Compared to a completely free-flying and e.g. radio controlled aerial vehicle as a carrier, i.e. in which—in complete contrast with a surveying rod as a carrier—there is no mechanical guidance by the user and no guidance relatively close to the user, there is the advantage that the handling or guidance is simplified and more secure such that even users who are inexperienced with flight control are able to handle the surveying device and use, e.g. indoors, especially in relatively small or contorted rooms with a high risk of collision, is improved or only even made possible.

Compared to embodiments with a passive aerial vehicle, there is the advantage that such an active aerial vehicle, depending on the embodiment, facilitates an active adaptation of the positioning and/or alignment, which is understood to mean e.g. an alignment of the scanning unit onto the surface to be surveyed, such that e.g. a homogeneous or less irregular distribution of the measurement points or the points of the 3D point cloud is achieved. In other words, this renders it possible, for example, to align or position the scanning plane in an optimized manner such that e.g. means for internal alignment correction of the scanning unit, as are disclosed in e.g. PCT/EP2014/059138, are rendered unnecessary. Such means may be provided optionally, especially in the case of a purely passive aerial vehicle. Moreover, the location of the aerial vehicle and hence of the scanning unit can advantageously be changed on a small scale within the scope of the freedom of movement predetermined by the lead; that is to say, there is an adaptation of the micro-position, for example to navigate around obstacles of sight or to make regions perceivable or accessible for the measurement radiation and hence for the scanning, which regions are not able to be surveyed in the case of positioning only by means of the lead (as is only possible in the case of a completely passive aerial vehicle). By way of example, this renders it possible to survey corners of a building which are difficult to access or cave-like small spaces.

The active adaptation of the positioning and/or alignment is optionally carried out on the basis of control commands by the user, wherein the control commands are preferably issued by means of a user unit, specifically a smartphone or tablet. Here, the control commands are optionally entered by multi-touch inputs and/or by moving the user unit on a touch-sensitive user field of the user unit. Alternatively, or additionally, the user unit has e.g. a joystick or directional pad. As a further alternative, the aerial vehicle, and/or the scanning unit too, is/are controlled in a contactless manner by the user by way of gestures, for the purposes of which the control and evaluation unit has a gesture control functionality such that recorded movement images of hand movements of the user are interpretable as control commands and corresponding control commands are able to be output to the aerial vehicle and/or the scanning unit. By way of example, a camera is arranged on the carrier, e.g. on the lower side of the aerial vehicle, said camera being aligned in the direction of the user or user hand and continuously registering images of the hand such that, for example, a quick hand movement in one direction is identified as a command for moving the aerial vehicle in this direction by means of its drive. For the purposes of an improved identification, the user hand may have an aid in this case, e.g. a carrier of optical marks. Optionally, control is effected by the user by virtue of the connection of the lead with the aerial vehicle being embodied as a control module such that a change in a state of the lead controlled by the user, in particular the applied tension and/or direction of tension, renders it possible to output a control command from the user to the aerial vehicle, preferably for actively changing the position and/or alignment, and/or to the scanning unit, in particular for starting and/or terminating a scanning process.

Furthermore, the active adaptation of the positioning and/or alignment is, alternatively or additionally, effected by routines, programmed into the control and evaluation unit, for semi-autonomous independent movement of the aerial vehicle (semi-autonomous to the extent that the independent movement is always effected within the scope of the indicatory position prescription by the lead). By way of example, such routines comprise the movement along a predetermined track, for example in a manner adapted to the type of object to be surveyed. Thus, for example, there may be an autonomous rotation of the aerial vehicle through approximately 360° about the vertical axis in the case of an internal space which is to be registered completely in a topographic sense, preferably in the case of embodiments embodied as a profiler. Furthermore, there is, additionally or alternatively, an adaptation of positioning and/or alignment on the basis of control commands from the control and evaluation unit, which are based on current measurement values, in particular acceleration and/or distance values, from the sensors of the aerial vehicle. Thus, the control and evaluation unit is then embodied for the automated adaptation, which is carried out in reaction to registered sensor values, e.g. distance values or inclination values. Thus, for example, there is an automatic adaptation of the distance to a measurement surface for the purposes of optimizing the measurement value registration, or collisions with obstacles or the measurement object are avoided thereby.

Since one problem when carrying out a surface survey is that, in principle, very high computational powers are required to register and process a point cloud of a surface three-dimensionally, particularly if registered scan lines are intended to be collated due to a movement of the measurement system, it is advantageous if this computational power is "outsourced" "to the ground", i.e., for example, to a user unit situated by the user. Thus, the raw data of the survey (3D coordinates or the deflection direction values and distance values underlying these or the direct detector values underlying the deflection direction values and distance values) are optionally transmitted via the lead as a data cable (or, alternatively, wirelessly by Bluetooth, WLAN, or the like) to the user unit and these raw data are evaluated by the user unit.

This data transfer is preferably carried out "on-the-fly", that is to say still in situ or during the surveying process. Here, the evaluation optionally comprises the generation of a 3D point cloud on the basis of the 3D coordinates, with the point cloud being displayed graphically on a display of the user unit. As a result, the user already still has the point cloud available as a measurement result (at least in part or as an approximate point cloud) in situ or during the measurement value recording managed by the guided carrier or immediately after the completion thereof. By way of example, this advantageously also renders possible the use of measurement results when still in situ, even in the case of an inspection or survey of the indoor or outdoor region of a building, for example a graphical display of the entire interior or the outer covering. Optionally, this also renders it possible for the user to be able e.g. to directly undertake a first evaluation of the survey and to be able e.g. to carry out additional surface surveys of surface regions which emerge as highly relevant or which were surveyed incorrectly (wherein the measurement results to this end naturally need not necessarily be present as a 3D point cloud but may e.g. be output in the form of a table). Alternatively, or additionally, such an evaluation or assessment is still carried out in situ in a semi or fully automatic manner by the control and evaluation unit. By way of example, the surface surveying functionality is additionally embodied in such a way that regions which are automatically assessed as being of particular interest (regions of interest, ROI), as being afflicted by errors or as having gaps (e.g. due to a scan shadow or a point coverage that is too low, for example in a very deformed region) are identified in the set of 3D coordinates or in the corresponding 3D point cloud. The result of such an identification or assessment is indicated to the user on the user unit, e.g. by pictures (colored marks, arrows or the like) in the graphical display of the 3D point cloud or by text notifications such that the user is appropriately informed and may be able to react where necessary, by virtue of discarding either the indication or the notification (if he does not consider the region or regions to be particularly relevant) or by virtue of carrying out further surveys, i.e. a second scan, with the scanning unit for one or more of these ROI. Alternatively or additionally, ROIs are identified by the user, for the purposes of which he marks these in the graphical display of the point cloud, e.g. on a touchscreen of the user unit, and the control and evaluation unit generates appropriate control commands for the second scanning on the basis of this user input. As a further alternative, or as a further addition, there is, in one development, preferably in the case of embodiments with an independently moving aerial vehicle (e.g. aerostat, multicopter) as a carrier, the utilization of the automatic or manual ROI identification in a fully automatic manner by way of an automatic second scanning of the ROIs, for the purposes of which, where necessary, the surface surveying device is directed to a location by the control and evaluation unit within the scope of the surface surveying functionality developed in this manner, from which location there is further scanning of the ROIs. Here, as an option, this fully automatic independent movement of the aerial vehicle may be carried out completely without guidance by the user, i.e. the guidance of the aerial vehicle by the user (by means of the lead) is given up temporarily, i.e. only for a restricted amount of time and merely within the restricted scope of the object of the targeted second or additional survey of surface regions of particular relevance, and the self-mobile aerial vehicle, from time to time, exhibits autonomous behavior or autonomous movement or autonomous positioning. By way of example, the user releases the lead to this end, wherein the lead may be rolled up by the aerial vehicle. It would also be conceivable for the lead to be detached from the aerial vehicle and the aerial vehicle to automatically go to a landing position after completion of the survey of the ROI or ROIs.

As a further option, the surface surveying device has a further surface measuring unit, e.g. an infrared camera and/or thermal imaging camera, in addition to the scanning unit. Using such embodiments, it is possible to carry out different measurement objects in a combined manner or to obtain different types of information about the surface to be surveyed such that, for example within the scope of a surface surveying functionality developed thus, the 3D point cloud (or the 3D coordinates themselves) generated on the basis of the 3D coordinates of the scanning unit is (or are) linked with measurement values of the further surface measuring unit. As a result, the user is provided with a further advantage in the form of obtaining additional information, for example in such a way that the graphical display of the 3D point cloud additionally contains information in respect of the temperature of the displayed surface.

As a further option, the aerial vehicle has a reserve energy source such that, in the case of failure or inadvertent decoupling of the primary energy source, which e.g. is connected by way of the lead embodied as a power cable, a completion of the measurement object or at least a controlled termination is possible.

The subject matter of the present invention furthermore relates to a method for determining a multiplicity of 3D coordinates of measurement points of a surface using a surface surveying device according to the invention, the method comprising in particular point-by-point, spatially displaceable, optical scanning of the measurement points of the surface by means of optical, coherent and collimated measurement radiation with a defined deflection direction, in particular laser radiation. Furthermore, the method comprises deriving distance values on the basis of detected reflected measurement radiation and determining 3D coordinates on the basis of the distance values and deflection directions.

Preferably, a 3D point cloud is generated on the basis of at least some of the 3D coordinates still during the scanning. Optionally, there is a graphical output of the generated 3D point cloud on a display, e.g. a user unit such as a tablet or smartphone. As a further option there is, as already described above, an automatic identification of particularly relevant regions (regions of interest, ROI) of the 3D point cloud, wherein, specifically, there is a graphical display of the particularly relevant region or regions on a display and/or there is automatic second scanning of the particularly relevant region or regions using the surface surveying device.

Further subject matter of the present invention relates to a computer program product, stored on a machine readable medium, or computer data signal, embodied by an electromagnetic wave, comprising program code for carrying out the method according to the invention, particularly if the program is executed in a control and evaluation unit of a surface surveying device according to the invention and/or in an external user unit connected thereto.

Further subject matter of the present invention relates to the use of an unmanned aerial vehicle which is capable of hovering and comprises a lead which is provided for guiding the aerial vehicle in the air by a user, wherein the position of the aerial vehicle in the air is predetermined by the effective length of the lead, for carrying a scanning unit according to the invention.

BRIEF DESCRIPTION OF THE DRAWINGS

The surveying device according to the invention and the method according to the invention are described in more detail below in a purely exemplary manner on the basis of specific exemplary embodiments which are schematically illustrated in the drawings, with further advantages of the invention also being discussed in detail. In detail.

DETAILED DESCRIPTION

Figure 1A:
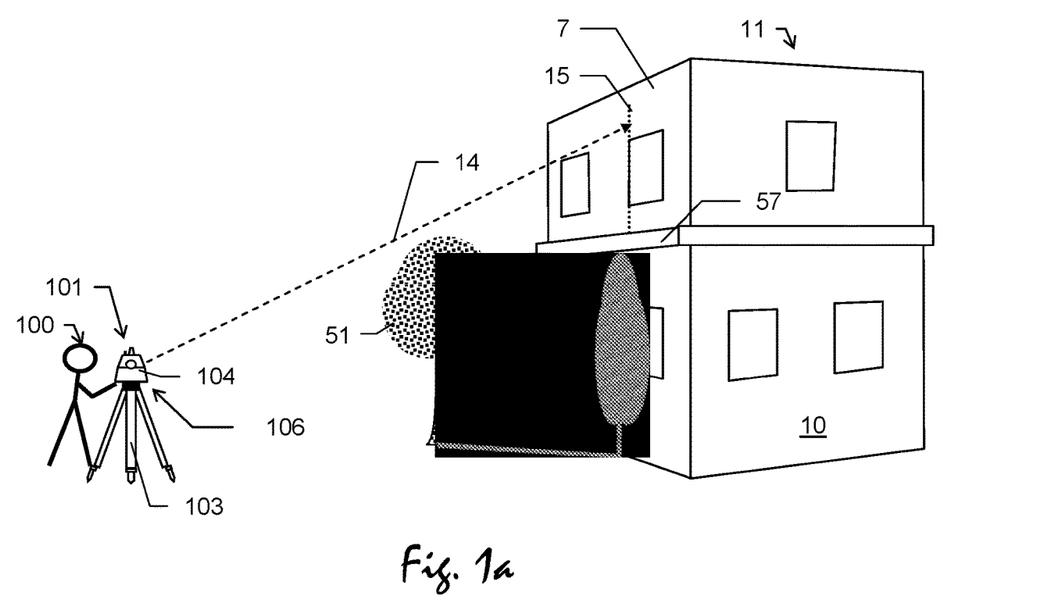
FIG. 1a,b show surface surveying devices according to the prior art.

FIG. 1a shows a user 100 when scanning a surface of an object 10, a house in this example, using a stationary surface surveying device according to the prior art, a terrestrial laser scanner 101 in this example, with a surface surveying functionality for 3D surveying of object surfaces of an object 10, according to the prior art. A 3D point cloud which represents the surface 7 of the object 10 is generated by such 3D surveying. Here, the laser scanner 101 comprises a scanning unit, embodied as a scanner unit 104, which is attached to a tripod 103 as a carrier and which emits a laser beam 14 as optical measurement radiation which is guided in a scanning manner over the house surface 7 by way of a deflection apparatus with deflection about two axes such that the measurement points are scanned (only part of only one of the many successive scanning lines are depicted in the figure for reasons of simplicity). Such a laser scanner 101 according to the prior art renders it possible to register the 3D coordinates of millions of surface points 15 with a high precision and within a very short period of time from the location 106 (of the scanning unit) on the basis of detected reflected measurement radiation and the detected deflection direction of the emitted measurement radiation.

A disadvantage herein is that, due to the proximity of the location 106 to the ground, a relatively large distance must be selected between house 10 and scanner 101. In the case of a smaller distance, the viewing or recording angles to the surface points in the upper region of the house wall are often so inexpedient that the precision of the 3D point cloud suffers therefrom and/or a very irregular point grid arises such that the generated 3D point cloud has a strongly varying point density (scanning lines have a greater spacing between the measurement points 15 in the region of the upper part of the house wall than in the region of the lower part thereof). However, due to structural conditions, e.g. a narrow street, it is not always possible to have a large distance from the object 10, or said large distance is disadvantageous, as depicted in the example, in that objects, such as e.g. the tree 51, are situated between the location 106 and the object 10, said objects causing a "scan shadow" 51a, within which no points on the house wall are registrable. Then, instead of the desired surface points of the house 10, the generated point cloud comprises points on the surface of the interfering object 51. Furthermore, it is disadvantageous, independently of the selected distance, that it is not even possible to survey the top side of the object 10 from the location 106 in proximity to the ground, i.e. that the roof 11 of the house 10 cannot be scanned in the example. Moreover, if the house wall is not plane (as illustrated) but has e.g. a wall projection or ledge 57, the upper edge thereof can likewise not be surveyed from the location 106 in proximity to the ground and the ledge 57 generates a further scan shadow in the upward direction, which shadows a further part of the house surface 7.

Figure 1B:
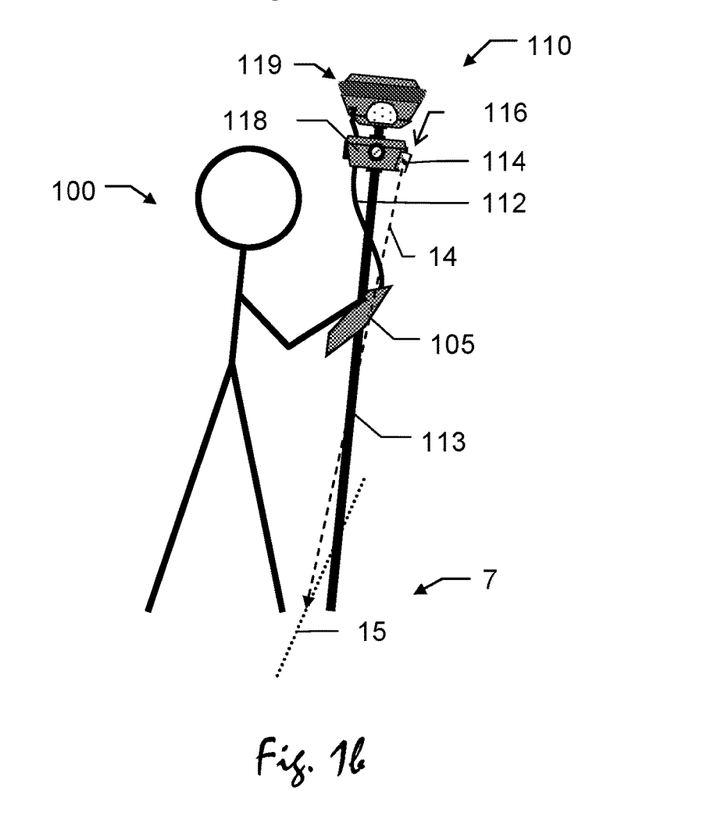

FIG. 1b shows a further surface surveying device according to the prior art, embodied as a mobile profiler 110. The profiler 110 has a surveying rod 113, which serves as a carrier for a scanning unit 114. The surface surveying device 110, and hence the location 116 of the scanning unit, is able to be changed by the user 100 by means of the surveying rod 113; however, this change is disadvantageously restricted to a horizontal plane. The scanning unit 114 emits a laser beam 14 which is deflectable about an axis, approximately vertically in the example, such that, inter alia, a ground profile of measurement points 15 is registrable along a line of the ground as surface 7 to be measured. (Alternatively, the laser beam 14 is swivelable horizontally such that horizontal profiles are registrable, or else swivelable about an axis with any other alignment.) As a result of the user 100 running around during the surveying, a two-dimensional ground profile is successively generable, wherein, for the purposes of relative linking of the individual measurement points amongst themselves and hence for the purposes of generating the 3D point cloud, the surveying device 110 has a camera module 118 in this example, said camera module serving by means of camera-based independent localization for the 6 DOF determination of the surveying rod 113 or the scanning unit 114 together with a GNSS antenna 119 and further position or acceleration sensors (not depicted here). In FIG. 1b, the scanning unit 114 is integrated into the housing of the module 114. Furthermore, a controller unit 105 is connected in the example according to FIG. 1b by means of a cable 112, said controller unit e.g. serving to control the scanning process. A disadvantage of such a profiler 110 according to the prior art is that, although there is an elevated scanning location 116 in comparison with a device according to FIG. 1a, said scanning location still is not sufficient for surveying high objects or objects situated high above the ground. A further disadvantage for the generation of ground profiles is that the surveying rod 113, as depicted here, shadows some of the ground (in the case of a completely vertical alignment of the laser beam 14, the GNSS antenna 119 would conversely shadow upwardly). Moreover, carrying a long and top-heavy surveying rod 113 is cumbersome for the user 100.

Figure 2A:
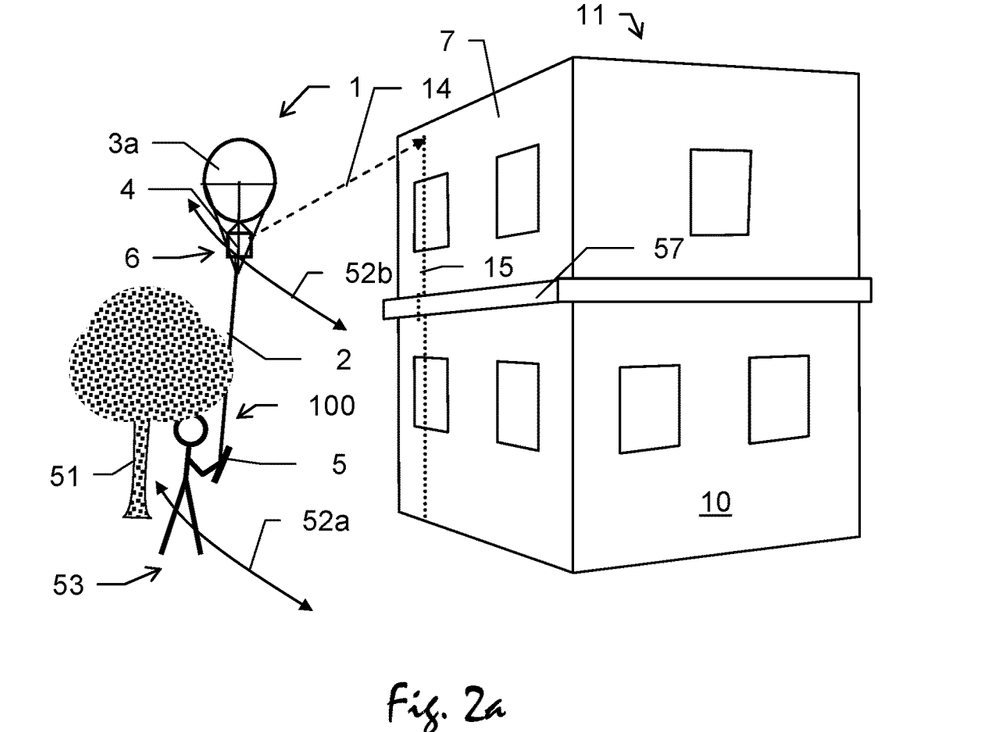
FIG. 2a shows a first embodiment of a surface surveying device according to the invention.

FIG. 2a shows a surface surveying device 1 according to the invention, with a surface surveying functionality for 3D surveying of surfaces 7 of an object 10. The surface surveying device 1 has a scanning unit 4 for scanning surfaces by means of measurement radiation 14, i.e. for generating a 3D scan or 3D profile, said scanning unit being carried by an unmanned aerial vehicle which is capable of hovering—a gas filled balloon 3a in this example. Here, the balloon 3a is fastened to a lead 2 which is held by the user 100. The height at which the balloon 3a hovers is set by the length of the lead 2 in this case, with the lead 2 being at least slightly tensioned (wherein the height of hovering naturally also depends on the height of the user 100 and the arm position, and the gas filling of the balloon 3a could also be tared so exactly that the desired height of hovering is maintained by the balloon 3a without tension in the lead 2). Here, a balloon 3a as purely passive aerial vehicle offers the advantage of very simple and—apart from inexpedient interferences by the surroundings, such as strong gusts of wind outdoors—very well controllable handling by the user 100. By means of the lead 2, the balloon 3a is able to be held by the user 100 at a desired height and, by selecting the user's location 53, and at a desired planar position such that the scanning unit 4 is positionable at a desired location 6. Thus, the lead 2 serves for the balloon 3a to be guided by the user 100, wherein the length of the lead 2 predetermines the height of the balloon 3a in the air (the balloon 3a rises as far as allowed by the length of the lead 2 in the tensioned state) and, by the selection of the user location 53, the horizontal position of said balloon, i.e., overall, the positioning of said balloon in the air. Optionally, the alignment of the aerial vehicle 3a is also predeterminable by the user 100 by means of the lead 2, for example by rotating the lead 2.

Thus, by way of the surveying apparatus 1 according to the invention, it is very easily possible to change the scanning location 6 in the three translational degrees of freedom, and optionally also in the three rotational degrees of freedom, and hence it is possible to select the location 6 of the scanning unit 4 with far fewer restrictions than when using apparatuses according to the prior art. As a result of this, it is possible to go around e.g. viewing obstacles or to register regions which are otherwise not able to be scanned, such as e.g. the upper edge of the wall ledge 57. By means of the surveying device 1 according to the invention, it is also possible to simply survey individual details of the object 10 to be surveyed in a separate manner and from a close location, particularly those details which are not situated with proximity to the ground, e.g. ornaments of the facade in the case of a building 10. The present invention also offers advantages, inter alia, in the case of small-area terrain surveys or when generating small-area terrain topographies or profiles, which cannot be carried out from a location on the ground and for which a survey by means of an airplane would require too much outlay. Likewise, advantages emerge with the surveying device 1 according to the invention for indoor surveys, for example in buildings with very high room heights such as plant floors or churches. By way of example, it is thus possible to scan the interior of a cathedral (particularly advantageously from a central location 6 not only in relation to the horizontal axis, but also in relation to the vertical axis, i.e. at the three-dimensional center of the room) and, in the process, to also survey, in particular, surfaces of individual elements in a precise and at least largely complete manner, even at such heights which could not be registered using apparatuses from the prior art, or only with great outlay, or the surveying of which using a free-flying aerial vehicle as a carrier of the surveying unit 4 would be deemed too dangerous. However, other very large or high objects are also rendered available for survey in a simplified or improved manner, or even at all, by using the surveying apparatus 1 according to the invention, for example ship hulls, heavy machinery or rocket cases, for example within the scope of quality control, state examinations or reverse engineering.

In the present example, the user 100 is able to select the height, at which the balloon 3a hovers, in such a way that the side of the house 10 can be scanned without viewing obstacles and with ideal recording angles. To this end, the balloon 3a, as illustrated, is positioned by the user 100, e.g. close to the tree 51, about half way up the house and between the house 10 and the tree 51, by means of the lead 2. Additionally, or alternatively, the house 10 is surveyed from a higher location 6 so that it is possible to scan the house roof 11. Thus, the balloon 3a can be positioned at the desired height by means of the lead 2. Furthermore, the scanning unit 4 is guided around the house 10 by means of the lead 2 by the user 100 in one movement 52a (of the user 100 himself or the movement 52b of the balloon 3a and the scanning unit 4 emerging from the guidance of the lead) in order thus to survey the entire object surface 7.

Here, the surveying device 1 has means for determining a position and orientation of the scanning unit 4 or the aerial vehicle 3a. In the example, the means serve for an active determination, i.e. the position and orientation of the scanning unit 4 are explicitly determined in such a way that the values thereof are available as storable data which, for example, are stored in a permanent memory of a user unit 5. The course of the location 6 and the orientation of the scanning unit 4 is thus stored during a continuous active determination and used e.g. for linking the individual measurement points 15 and hence when generating the 3D point cloud. The location 6 and the orientation change e.g. as a result of the aforementioned movements 52a and 52b, but also if the location 6 and/or the alignment of the scanning unit 4 is not completely stable during a scanning process due to interfering external influences (wind, inadvertent movements of the user 100). The means for determining the position and orientation (roll, pitch, yaw) have in the example, on the part of the carrier, e.g. at or on the balloon 3a, an inertial measurement unit (IMU) and a camera for continuous image recording (not depicted here), wherein the images of the camera serve for the camera-based independent localization. The means may have a GNSS antenna in addition, or as an alternative, to the camera. The control and evaluation unit is embodied here to continuously determine the position and orientation of the scanning unit 4 or of the aerial vehicle 3a by means of an algorithm, using the continuously measured values from the IMU (acceleration information) and the camera images or the independent localization (and/or the GNSS signals where necessary). The algorithm is preferably a state estimator which, for example, is based on a Kalman filter. Here, use is optionally made of a SLAM (simultaneous localization and mapping) algorithm. By way of example, there is an image evaluation in respect of corresponding features or of homologous image points in at least two images of an image series of the camera within the scope of the camera-based independent localization. This is effected by means of matching algorithms such as SIFT, SURF, BRISK, BRIEF, etc., as a result of which a plurality of object points which serve for position referencing are set. This is correspondingly continued for further images in a manner known to a person skilled in the art. In the case of a video recording as an image series, correspondences or homologies may be found by means of a tracking algorithm, e.g. the Kanade-Lucas-Tomasi (KLT) feature tracker algorithm. Thus, generating an image series means the generation of image data by continuous (in accordance with a predetermined temporal or spatial grid) recording of individual images or video frames. Data from a IMU and, where applicable, from a GNSS receiver are used additionally here, in the example, for determining the relative poses between images of the image series. A refinement of the result may be optionally obtained at the end, for example by bundle adjustment.

Alternatively, or additionally, the scanning unit 4 has an additional target camera, by means of which the alignment or the target direction of the scanning unit 4 is able to be adjusted or monitored live on the display of the user unit 5 by means of image transfer through the cable 2. As an alternative to a lead 2 embodied as a data cable, the scanner unit 4 and the user unit 5 have modules for wireless data transfer, e.g. Wi-Fi or Bluetooth modules. Additionally, or alternatively, the control and evaluation unit is completely or partly housed in the scanning unit 4.

The lead 2 is electrically conductive, i.e. embodied as a cable which is able to transport electric currents or signals and which is connected to the scanning unit 4 in this example. On the side of the user, the cable 2 is connected to the user unit 5 which, as part of the surveying device 1, has a control and evaluation unit embodied to carry out the surface surveying functionality. The depicted embodiment offers the advantage that control commands are transferable to the scanner unit 4 by the user 100 by means of the user unit 5, e.g. a portable computer or field controller. Furthermore, conversely, data, especially already recorded 3D point coordinates or the raw data thereof, are transferable from the scanner unit 4 to the user unit 5. These data are stored by a data memory of the user unit 5.

Moreover, the control and evaluation unit is advantageously configured in such a way that the data are at least in part evaluated still during the measurement ("on the fly") such that it is possible, e.g. still during the measurement process, to show an at least approximate, preliminary or not yet complete 3D point cloud on a display of the user unit 5 to the user 100. Hence, the surveying process is able to be monitored and, when necessary, corrected by the user 100 in real time. Moreover, it is possible still to evaluate the measurement result in situ and e.g. carry out one or more additional scans, i.e. a second scanning, of particularly interesting regions (regions of interest, ROI) of the surface 7. Examples of ROIs are non-scanned regions or regions with scanning gaps, e.g. due to a scan shadow, regions with conspicuously deviating or clearly incorrect measurement data, or regions which are recorded with a resolution which is relatively low for the structure (e.g., relatively high point densities are desirable for forms with many corners and edges, whereas a plane surface is also scanned to a sufficient extent by low point densities). In the aforementioned embodiments with an optical target camera, ROIs are also optionally selectable by the user 100 in advance or following the first time scan on the basis of a target camera image. Here, the target camera image and the 3D point cloud can also be shown together, e.g. in superposition, on the display.

Figure 2B:
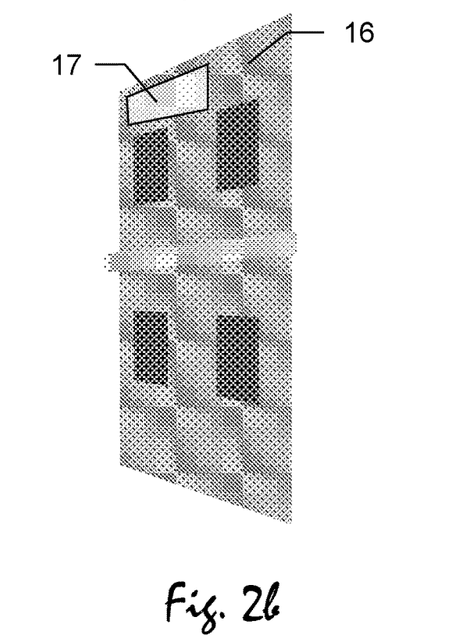
FIG. 2b shows an example for a 3D point cloud generated by means of the surface surveying device according to the invention.

FIG. 2b shows, in an exemplary manner, the resultant point cloud 16 which is generated on the basis of the measured 3D coordinates. The point cloud 16 in this case represents the surface 7 of the house 10 and therefore constitutes an image or a model of part of the house 10, as can be displayed to the user 100 on e.g. a display of the user unit 5. Advantageously, the surface 7, i.e. the one side of the house 10, is registered completely without a scan shadow by the present invention such that the generated point cloud 16 also represents the entire surface 7. In the example, the representation contains a marking of a particularly relevant region (ROI) 17, which was automatically established by the control and evaluation unit within the scope of a developed surface surveying functionality or else which was marked manually by the user in the point cloud graphics. In the example, the marking highlights for example a region 17 which indicates a damaged position of the house wall, which was identified by e.g. an uneven surface or a distribution of the corresponding 3D points which deviates from the remainder or from the surroundings. There then optionally is second scanning of this ROI using the surface surveying device 1, for example with an increased resolution compared to the preceding scanning. Here, the second scanning is carried out by virtue of the balloon 3a or the scanning unit 4 being positioned at the appropriate height and appropriate position by the user 100 by means of the lead 2. In embodiments with motorized aerial vehicles 3b, 3c (see the following figures), such fine positioning may also be carried out automatically by the control and evaluation unit in a manner dependent on the identified ROIs 17 such that, therefore, the aerial vehicle 3b, 3c independently moves to the suitable recording location within the scope of the predetermined positioning, or the scanning unit 4 is independently aligned on the ROI 17. Here, it is also possible for the position prescription by the lead to be completely discarded for precisely this purpose of a second survey of one or more ROIs 17, and so the aerial vehicle 3b, 3c is freely movable on a temporary basis. This would provide advantages, particularly if the second scanning or the new detailed scanning of an ROI 17 would not be possible in the case of position predetermination by the lead 2 because a suitable, or rather necessary, scanning location 6 cannot be assumed when tethered to the lead 2.

Figure 3:
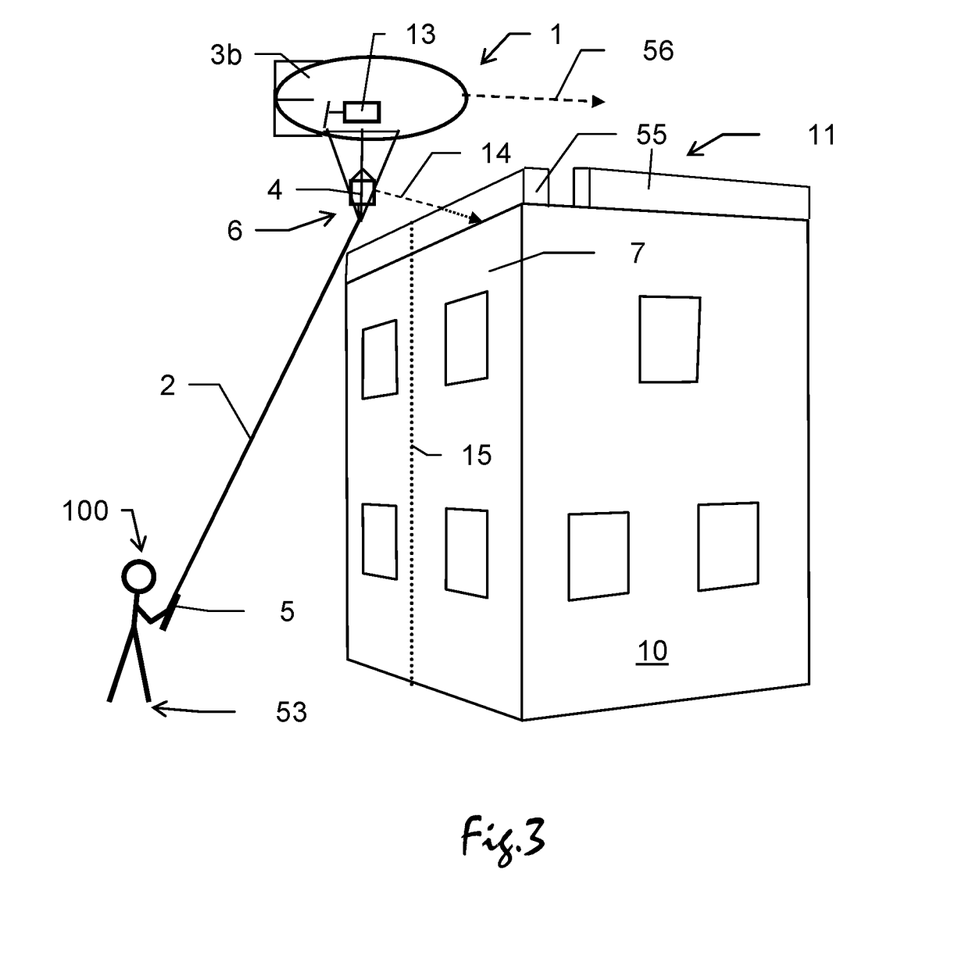
FIG. 3 shows a second embodiment of a surface surveying device according to the invention.

FIG. 3 shows a further embodiment of a surveying device 1 according to the invention with a surface surveying functionality. In contrast to the previous embodiment, the unmanned aerial vehicle which is capable of hovering is embodied as an aerostat 3b, i.e. it comprises drive means (nacelle) which enable independent propagation, at least in the horizontal direction. The radius of movement or movement leeway is restricted by the lead 2 in this case, and so the position or movement of the dirigible 3b, or the location 6 of the scanner unit 4, is substantially predetermined by the user 100 by means of the lead 2. Here, the flight direction 56 of the aerostat 3b is controlled by the user 100 by remote control by means of the user unit 5, wherein the control signals are routed to the aerostat 3b by way of the lead 2 embodied as power or signal cable. Here, the control is brought about for example by means of control elements (control lever, buttons, etc.) found on the control unit 5, or by movements (tilts, rotations, lateral movements, etc.) of the control unit 5 itself. Here, in this context, there optionally also is control by movements of the control unit 5 or simply of the hand of the user 100, which are identified by means of a camera on the aerial vehicle 3b such that the lead 2 need not serve to transfer control signals. Alternatively, such a camera for recording movements of the control unit 5 or of the user 100 (or of gestures of the user 100) is attached to the lead 2. Alternatively or additionally, the independent movement of the aerostat 3b (which is only possible to a restricted extent due to the lead 2) takes place (semi)autonomously in accordance with a flight routine (e.g. traveling a circle or a 90° rotation) set in advance by the user 100 or in the control and evaluation unit and/or on the basis of control signals, which are output on the basis of sensors (in particular distance sensors) of the aerostat 3b.

The use of an aerial vehicle with a dedicated drive and/or control means, such as e.g. a rudder, improves or simplifies the selection of the surveying location 6 of the surveying unit 4, for example by virtue of not only a plurality of similar locations 6 or locations lying close together in the vertical direction being possible from a single location 53 of the user 100 (by changing the length of the lead 2), but also a plurality of locations 6 in the horizontal direction as a result of the independent movement of the aerostat 3b. In this case, it is still comparatively easy for the user 100 to control the aerial vehicle 3b. Moreover, surveying locations 6 which cannot be reached by a purely passive aerial vehicle such as a balloon are rendered possible. In the example, the house 10 has structures 55 on the roof, by means of which the front region of the roof 11 is shadowed when observed from a location 6 in front of the house, and so a "scan shadow" is present when using a balloon as a carrier unit. By contrast, when using the dirigible 3b, it is possible to shift the surveying location 6 a little in the flight direction 56 into the roof region such that it is also possible to survey the roof region lying directly behind the structure 55 when seen from the user or from the front (arrow 14).

Moreover, the drive elements or active control elements of the aerostat 3b possibly facilitate improved stability of the spatial position, and so inadvertent and bothersome changes of the location 6 can be reduced or prevented. To this end, the means for determining a position and orientation of the scanning unit 4 preferably facilitate a continuous passive determination, i.e. deviations or changes of position and orientation are measured and control signals are output to the drive or control elements on the basis of these measured values such that the deviations are compensated and hence a flight stabilization is achieved. To this end, permanent storage of the position and orientation values is not necessary, and so the values can be discarded or overwritten directly after use.

Figure 4A:
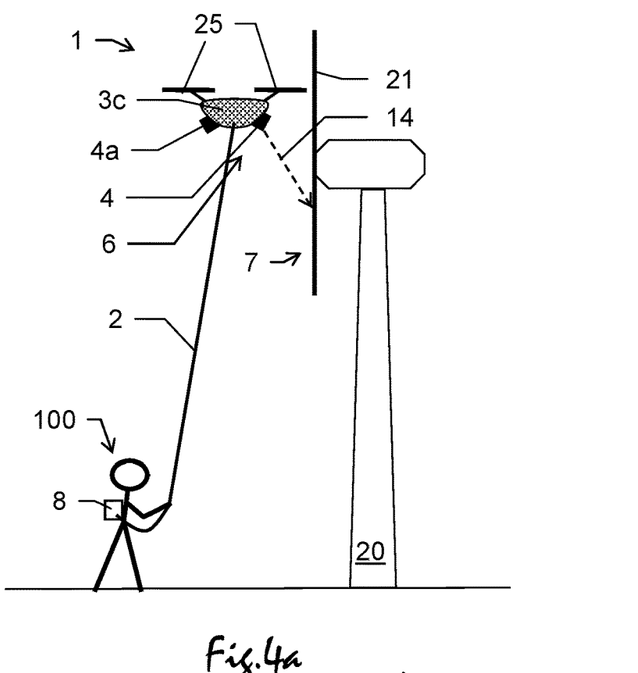
FIG. 4a,b show further embodiments of a surface surveying device according to the invention.

In a side view, FIG. 4a shows a surface surveying device according to the invention for 3D surveying of object surfaces 7, in which the aerial vehicle is embodied as drone, or multicopter 3c, which is capable of hovering and has at least two, preferably four, rotors 25 which facilitate a flying and hovering movement of the aerial vehicle 3c. A possible alternative to a multicopter 3c is an unmanned miniaturized helicopter. According to the invention, the multicopter 3c is fastened to the lead 2 and moreover guided by the user 100. Although such an aerial vehicle 3c may, depending on the embodiment, place higher requirements to the control or guidance by the user 100 in comparison with an aerostat or even a balloon according to the embodiments in FIGS. 2a and 3, respectively, these are reducible, however, as an option by (semi)autonomous flight capabilities or control of the multicopter 3c, and said requirements still are substantially reduced in comparison with a completely free-flying, unbound carrier. Optionally, it is e.g. possible to operate the multicopter 3c as a virtually passive aerial vehicle, i.e. the drive means serve only to establish a stable hovering capability on the lead 2 (comparable to a balloon) and are not used for a targeted independent movement. Here, the lift by the drive is in any case set in such a way that the lead 2 is at least slightly tensioned or, phrased differently, the multicopter 3c would rise higher if the lead 2 were not held by the user. Here, a safety mechanism may be provided, especially in the case of embodiments without remote control, said safety mechanism identifying an (inadvertent) release of the lead 2 and initiating a sinking of the multicopter 3c. Alternatively, the drive or the control elements are used for movement of the multicopter 3c which does not immediately result from the guidance by the lead 2, i.e. for a change of the micro-position or fine position within the scope of the macro-position or approximate position predetermined by the lead 2. Control commands for carrying out such an independent movement may in this case be output by the user as described in relation to FIG. 3. By way of example, the connection of the lead 2 to a multicopter 3c is optionally also embodied as a control module, and so it is easy to carry out e.g. control commands by movements or state changes of the lead 2, for example by virtue of a jerky pull of the lead 2 in a horizontal direction commanding a movement of the aerial vehicle in precisely that direction. Here, the change of state of the lead 2 is registrable by e.g. a force sensor or, optically, by the control module. Expressed differently, a command may be issued to the aerial vehicle 3c or the scanning unit 4 by e.g. changing the tension or the direction of tension of the lead 2. A further advantage in relation to an unbound surveying apparatus 1 is that it is possible to configure the aerial vehicle 3c more easily, and therefore it is possible to produce it more cost-effectively, in comparison with a completely free flight capability on account of the lower demands. Compared to the aerostat according to FIG. 3, a drone or multicopter 3c offers the advantage of a further increased active movement of the aerial vehicle 3c and hence a further improved adaptation of the surveying location 6 within the scope of the position predetermined by the lead 2. As a result, it is also possible to survey very contorted, irregular or structure-rich objects with comparatively little outlay or even for the first time in the entirety thereof.

In the example according to FIG. 4a, the object whose surface 7 should be surveyed in three dimensions is a wind energy installation or wind turbine 20. Since such installations have large dimensions and, when put up, a large height (in FIG. 4a, the illustration is too small by comparison for graphical reasons), they already require increased outlay prior to the assembly when using surveying apparatuses of the prior art and are hardly still surveyable from the ground in the fully installed state. In particular, according to the prior art, highly relevant installation parts, such as the rotor blades 21, are largely withdrawn from a precise surface inspection after installation. By contrast, using the surveying apparatus 1 according to the invention, a scanning unit 4 can be positioned in relation to the rotor blades 21 and therefore the latter can be surveyed from an ideal location 6, for the purposes of which the scanning unit 4 is advantageously embodied for scanning by deflecting the measurement beam through two axes. Moreover, the scanning unit 4 is movable along the respective rotor blade 21, and so, for example, a multiplicity of highly detailed individual scans or highly precise individual 3D point clouds are possible, wherein the individual point clouds may be linked, still in situ, to an overall 3D point cloud in post-processing or by the control and evaluation unit of the surveying apparatus 1. Optionally, the control and evaluation unit in this case has different surveying modes for different surfaces 7 or objects 20, e.g. one mode for surveying wind energy installations 20 and one mode for surveying houses 10, wherein, depending on mode, the scanning unit 4 and/or the aerial vehicle 3c is/are operated differently, e.g. in respect of a scanning pattern of the deflection apparatus of the scanning unit 4 or an independent movement of the multicopter 3c.

In the example, the surveying device 1 according to the invention has a further surveying unit 4a in addition to the measurement-beam-based scanning unit 4. By way of example, this is a further, identical scanner or profiler unit such that a plurality of objects 20 or different surfaces 7 of an object are surveyable in 3D, in particular at the same time, from a location 6, without a change in position or rotation of the multicopter 3c. Alternatively, the further surveying unit 4a is a different type of measuring surveying unit such that a single surveying apparatus 1 is embodied for different measurement objects. Preferably, this further surveying unit 4a likewise measures in a contactless manner and is e.g. embodied as an infrared camera or thermal imaging camera; however, it can also be a tactile surveying unit which e.g. establishes a conductivity of the surface. This also facilitates linking of 3D coordinates of a surface, i.e. the surface information in terms of coordinates which were obtained by the scanning unit 4, with a different type of surface information in respect to the same surface, which were measured by the further surveying unit 4a.

The energy requirements of an aerial vehicle which is capable of hovering due to an air flow caused e.g. by the rotation of the rotors 25 are high when compared to aerial vehicles which obtain lift as a result of a difference in density (balloon, aerostat). Therefore, the lead 2 is advantageously embodied as a power cable, especially in embodiments with a multicopter 3c or a similar active aerial vehicle, said power cable being embodied for supplying the multicopter 3c with energy (as an alternative, or in addition, to an above-described data or control signal transmission) and being connected to an energy source, a battery 8 in this example, on the ground. In the example, the battery 8 is carried by the user 100 on his back. "Outsourcing" the energy supply from the multicopter 3c advantageously facilitates a significant reduction in the weight of the multicopter 3c, and so the energy requirements thereof are significantly reduced. At the same time, the battery 8, and hence the capacity thereof, can be selected to be much larger (or it is possible to use a more cost-effective battery 8 with the same capacity, the components of which need not be selected according to a weight and/or volume which is as small as possible). Overall, this renders it possible to obtain a significantly increased maximum flight duration of the multicopter 3c, and hence a lengthened assignment duration of the surveying device 1, when compared with embodiments with onboard batteries or with surveying devices (with freely flying devices) without lead, and hence without cable, according to the prior art.

Figure 4B:
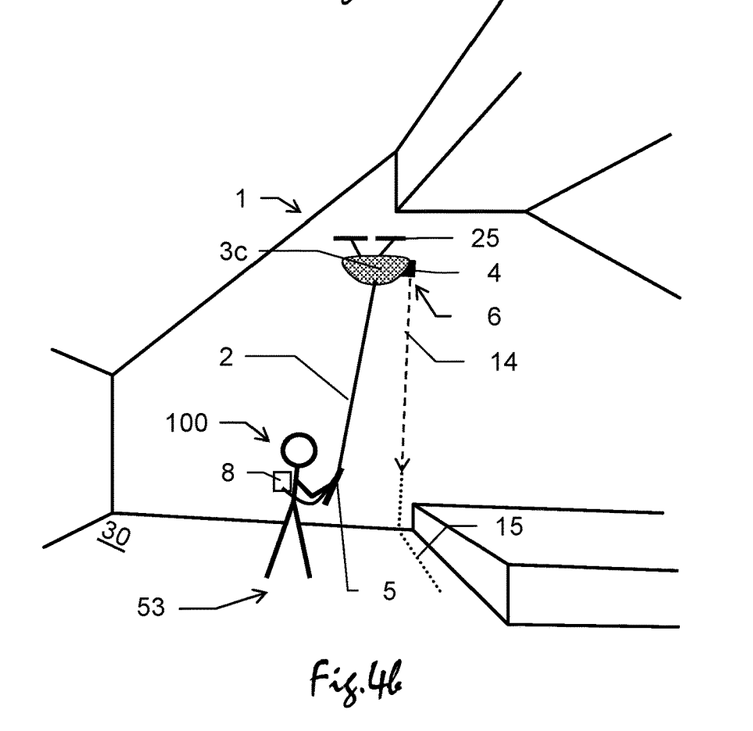

FIG. 4b shows the use of a surface surveying device 1 according to the invention with a multicopter 3c as carrier for surveying an interior 30. The effective length of the lead 2, which once again serves as power cable for connecting the multicopter 3c to a battery 8, is correspondingly shorter in such an application than in the example according to FIG. 4a. The surface surveying device 1 is embodied as a profiler, wherein the scanning unit 4 is arranged in the multicopter 3c in such a way that the laser beam is deflected about a horizontal axis. Therefore, it is possible to scan the room 30 in the complete cross section thereof and generate a 3D point cloud representing the whole room 30 by the user 100 passing through the room, i.e. by regularly changing his location 53, said 3D point cloud e.g. being shown directly to the user 100 on the user unit 5. Here, an independent movement of the multicopter 3c is used in an assisting manner, for example a rotation, preferably a complete rotation, about the z-axis or vertical axis, or a translation in the xy-plane or horizontal plane, as a result of which e.g. passing through the room 30 may be reduced or rendered completely unnecessary, as a result of which, furthermore or alternatively, the scanning unit 4 may alternatively be embodied as a scanner unit and hence the surveying device may be embodied as a scanner 4, i.e. the measurement beam 14 is swivelable or deflectable about two axes.

It is understood that these depicted figures only illustrate possible exemplary embodiment in a schematic manner. According to the invention, the various approaches can likewise be combined with one another and with systems and methods for surveying surfaces or objects and with surveying devices from the prior art.

What is claimed is:

1. A surface surveying device, for determining a multiplicity of 3D coordinates of measurement points on a surface, comprising:
    a scanning unit for optically scanning the surface with optical, coherent and collimated measurement radiation having at least one deflection direction and for detecting the measurement radiation reflected by a respective measurement point,
    means for determining a position and orientation of the scanning unit,
    a carrier for carrying the scanning unit and at least part of the means for determining a position and orientation,
    a control and evaluation unit with a surface surveying functionality for controlling the scanning unit and for determining the 3D coordinates of the measurement points on the basis of the respective deflection direction and a distance value derived by means of detected measurement radiation,
    wherein:
    the carrier is embodied as an unmanned aerial vehicle which is capable of hovering and comprises a lead, the latter being connected at one end thereof to the aerial vehicle and being designed to be held at the other end by a user,
    the lead is provided for guiding the aerial vehicle in the air by the user by hand, and
    the position of the aerial vehicle in the air is predetermined by the effective length of the lead, said length being changeable by the user, and
    the lead is electrically conductive and serves for:
        energy supply; and/or
        control signal transmission and/or data signal transmission,
    to and/or from parts of the surface surveying device situated in the air.

2. The surface surveying device according to claim 1, wherein
    the means for determining the position and orientation are embodied to actively determine the position and orientation for the purposes of obtaining position and orientation values as storable data.

3. The surface surveying device according to claim 1, wherein
    the means for determining the position and orientation are embodied to continuously passively determine the position and orientation for stabilizing the flight of the aerial vehicle.

4. The surface surveying device according to claim 1, wherein
    the means for determining the position and orientation have, on the carrier side,
    sensors for continuously measuring an acceleration and/or rate of rotation and/or magnetic alignment, specifically an inertial measurement unit, and
    at least one camera for continuously recording images of an image series within a scope of a camera-based independent localization and/or receivers for continuously receiving position reference signals, GNSS signals, and/or pseudolite signals, and the control and evaluation unit is embodied for carrying out an algorithm specifically on the basis of a Kalman filter, for continuously calculating the position and orientation in real time, on the basis of the continuously established data from the sensors and the camera and/or receivers.

5. The surface surveying device according to claim 4, wherein if the camera is present for continuously recording images within the scope of the camera-based independent localization, the algorithm is embodied, by having structure-from-motion or SLAM algorithms, to determine position and orientation of images in the image series on the basis of resection with the aid of surface points which are registered in at least two images of the image series, wherein the surface points are selected for resection by means of feature-extraction algorithms and/or tracking algorithms.

6. The surface surveying device according to claim 1, wherein:

the surface surveying device has a wired or wireless interface for connecting an external user unit, a smartphone, or tablet.

7. The surface surveying device according to claim 1, wherein:

the alignment of the aerial vehicle is also predeterminable by the user by means of the lead.

8. The surface surveying device according claim 1, wherein:

raw data and/or 3D coordinates of surveyed measurement points are transferable to a user unit, by means of a data signal transfer through the lead, in such a way that, on the basis of the 3D coordinates, a 3D point cloud is generable and graphically displayable on the user unit still during surface surveying.

9. The surface surveying device according claim 1, wherein the aerial vehicle is passive.

10. The surface surveying device according to claim 1, wherein the aerial vehicle has at least one drive means and/or control means for actively adapting the position and/or alignment which is predetermined by the effective length of the lead, for optimized alignment of the scanning unit onto the surface to be surveyed, wherein the aerial vehicle is embodied as an aerostat or multicopter.

11. The surface surveying device according to claim 8, wherein the active adaptation of the position and/or alignment is carried out on the basis of control commands of the user, wherein the control commands are issued by means of a user unit, specifically a smartphone or tablet and/or by multi-touch and/or by movement of the user unit.

12. The surface surveying device according to claim 8, wherein the active adaptation of the position and/or alignment is carried out on the basis of routines for semi autonomous inherent movement of the aerial vehicle programmed into the control and evaluation unit.

13. The surface surveying device according to claim 8, wherein the active adaptation of the position and/or alignment is carried out on the basis of control commands of the control and evaluation unit which are based on current measurement values from the sensors of the aerial vehicle.

14. The surface surveying device according claim 1, wherein the control and evaluation unit has a gesture control functionality such that control commands are output to the aerial vehicle and/or the scanning unit on the basis of recorded movement images of hand movements of the user, wherein the carrier has a camera for recording the movement images.

15. The surface surveying device according claim 1, wherein the connection of the lead to the aerial vehicle is embodied as a control module such that a control command is able to be issued by the user to the aerial vehicle, for actively changing the position and/or alignment, and/or scanning unit, for starting and/or completing a scanning process, by a change in a state of the lead which is controlled by the user.

16. The surface surveying device according claim 1, wherein the surface surveying device has a further surface measuring unit in addition to the scanning unit, the further surface measuring unit including an infrared camera and/or thermal imaging camera, wherein there is linking of 3D coordinates, with the measurement data from the further surface measuring unit within a scope of the surface surveying functionality.

17. The surface surveying device according claim 1, wherein the aerial vehicle has a reserve energy source.

* * * * *